US005110245A

United States Patent [19]

Hiroyuki

[11] Patent Number: 5,110,245

[45] Date of Patent: May 5, 1992

[54] THREAD FORMING SCREW

[75] Inventor: Sakamoto Hiroyuki, Fukuchiyama, Japan

[73] Assignee: Nitto Seiko Co., Ltd., Kyoto, Japan

[21] Appl. No.: 581,541

[22] Filed: Sep. 12, 1990

[51] Int. Cl.[5] .......... F16B 35/04

[52] U.S. Cl. .......... 411/421; 411/417

[58] Field of Search .......... 411/417, 420, 421, 418, 411/419

[56] References Cited

U.S. PATENT DOCUMENTS

| | | | |
|---|---|---|---|
| 497,510 | 5/1893 | Adler | 411/421 |
| 1,088,892 | 3/1914 | Foreman | 411/418 |
| 1,294,268 | 2/1919 | Holmes | 411/421 |
| 1,465,148 | 8/1923 | Rosenberg | 411/418 |
| 3,083,609 | 4/1963 | Lovisek | 411/418 |
| 4,161,132 | 7/1979 | Eklund et al. | 411/417 |
| 4,652,194 | 3/1987 | Tajima et al. | 411/417 |
| 4,842,467 | 6/1989 | Armstrong | 411/417 X |

FOREIGN PATENT DOCUMENTS

| | | | |
|---|---|---|---|
| 448628 | 5/1948 | Canada | 411/417 |
| 1011140 | 5/1977 | Canada | 411/417 |
| 667051 | 2/1952 | United Kingdom | 411/417 |
| 1120991 | 7/1968 | United Kingdom | 411/417 |

*Primary Examiner*—Rodney M. Lindsey

*Attorney, Agent, or Firm*—Koda and Androlia

[57] ABSTRACT

This invention relates to an improvement of a thread forming screw including driven head, cylindrically formed shanks rolled type thread which has a following flank angle smaller than a progresssive flank angle and is interrupted by plural slot recesses locating in one revolution of the thread and being pretendedly formed as helical slot recesses. One of the recesses is formed by a duly inclined leading edge of an interrupted thread, a nearly perpendicular rearward edge of the one located at its leading side and a flat-like bottom located betweenthere. This configuration of the shank enable it to be easily driven into a workpiece because of the decreasing the engagement between the interrupted screw thread and the female thread formed thereby. And it can prevent the fastener from rotating in such directions that it can loose because the following flanks of the interrupted threads depress the female thread swaged thereby and the materials are deformed, flown and dropped into the recesses nearby in an axial tension and the drops of the material prevent the threads from sliding back along the female thread.

1 Claim, 2 Drawing Sheets

1
2
III
III
A
3a
3
4
4b
6
4a
3b 3
4
4b
4a
6b
6
6c
6a 1
2
III
III
A
3a
3
4
4b
6
4a
3b 3
4
4b
4a
6b
6
6c
6a

THREAD FORMING SCREW

FIELD OF THE INVENTION

This invention relates to thread forming fasteners preferably suited for workpieces of plastic resins which are used in such bad conditions as under particularly high temperatures and in repeated thermo-cycles from high temperature to low one.

PRIOR ART AND OBJECT OF THE INVENTION

In these years various kinds of workpieces made of plastic resins have been improved, developed and got to be used in wide applications. With this tendency, they are often used in such bad conditions as under high temperatures and in repeated thermo-cycles. In these bad conditions, the plastic resins can change their properties in such ways that they can be kept viscosity, elastic and show a intermediate property between that of rubber and metal at normal temperatures and they can be significantly shrunk and decreased in their volumes as the ambient temperatures are descended after they are significantly deformed by themselves. Therefore, in cases that a self-tapping fastener has been driven into a workpiece of plastic resin it has a disadvantage that it can easily decrease its axial tension and its holding strength because of the deformation of the material by repeated thermo-expansion and shrinkage of plastic resin as well as by aging stress relaxation of the material and it can easily rotate in such directions that it can loosen with a small unfastening torque.

It is a particular object of the present invention to remove the above disadvantage and to provide with thread forming fasteners which can be prevented from rotating in such directions that it can loosen with their axial tension decreased under such bad conditions as in wide variations of ambient temperatures.

SUMMARY OF THE INVENTION

To achieve the above object, a thread forming fastener comprising a driven head with a recess or a convex surface which a driving bit can engage with, a shank portion with a rolled type thread. The thread is interrupted by plural slot recesses being pretendedly formed as herical slot recesses with a lead angle reverse to an inclination of the interrupted threads each of the recesses is formed by a dully inclined leading edge of the interrupted threads, a nearly perpendicular rearward edge of the interrupted threads and a partially cut-away screw thread between two adjacent interrupted threads which can have desirable depths of recesses depending on a percentage of a height of a screw thread to that of a female thread formed thereby, that is depending upon a percentage of an external diameter of the screw thread to that of a pilot hole in a workpiece.

And besides the interrupted threads can be so formed that a following flank angle of the threads over the shank portion is smaller than a progressive flank angle of the same threads. Furthermore, the fastener can be formed that it has a tapered end with parts of a continuous screw threads without slot recess.

OPERATION

In a thread forming fastener described above, parts of a rolled thread over a tapered end can progressively swage a female thread at a side wall of a pilot hole in a workpiece of plastic resin when the fastener is driven there. And then the interrupted threads over a straight portion of a shank portion can swage and enlarge a female thread swaged by the screw thread over the tapered end to a desired shape in the side wall. In this operation a total amount of the engagement of the interrupted threads with a female thread are decreased by plural recesses and it causes a driving torque added by a driving bit to concentrate on the interrupted threads. And also each leading edge of the interrupted threads is so dully inclined that the fastener can smoothly swage the female thread in the workpiece.

When the fastener has an axial tension by itself after it is driven into a workpiece of plastic resin, each following flank of the interrupted threads can depress the workpiece. Therefore, the following flanks can deform parts of the material so that the deformed material can move and flow parts of the material of the workpiece near the both edges of the interrupted threads into recesses nearby so as to be the drops of the material which can prevent the fastener from rotating in such directions that it can loosen. As the material of plastic resin, under the circumstance, is repeatedly and alternatively expanded and shrunk by wide variation of ambient temperatures, the parts of the material engaged with the interrupted threads are deformed and shrunk so that the fastener can have clearances between the progressive flank of the interrupted threads and the female thread. Therefore, the friction betweenthere and an axial tension created by itself are decreased. However, the drops of the material located in the recesses nearby is solely hardened with a very small deformation. Then the drops of the material prevents the fastener from rotating in such directions that it can loosen even if a small unfastening torque is added to it because the drops are respectively engaged with each rearward edge of the interrupted threads nearby. And besides the plural recesses are pretendedly formed as herical slot recesses with a lead angle inclined reverse to an inclination of the threads and relative to its axis with a very small angle. Therefore the recesses causes each corner at the following flanks of the rearward edges of the interrupted threads to be dully formed and it is very difficult for the dully formed corners to wedge the drops of the material so that the drops cannot be destroyed and then the fastener can increase a loosening torque.

Further the fastener is so formed having a smaller following flank angle of the interrupted threads that each following flank of the interrupted threads can depress the workpiece so as to increase the deformation as much as possible and flow the parts of the material into the recesses nearby as much as possible. Therefore, the fastener can have the drops of the material enough strong to prevent it from rotating in such directions that it can loosen.

Furthermore, the fastener is formed having the tapered end at its end of the shank portion and having part of a rolled thread without slot recess so that the tapered end can have no nibbling edge of the rolled thread and the fastener can smoothly rotate in such directions that it can loosen, wedge the workpiece and swage a female thread quickly therein.

Moreover, the fastener is formed having each of the recesses which form a cut-off screw thread between two adjacent interrupted threads so that it can select a desirable depth of a recess depending on a percentage of the height of a screw thread to that of a female thread, that is the percentage of an external diameter of the screw thread to that of a pilot hole in a workpiece.

DETAILED DESCRIPTION OF THE INVENTION

Figure 1:
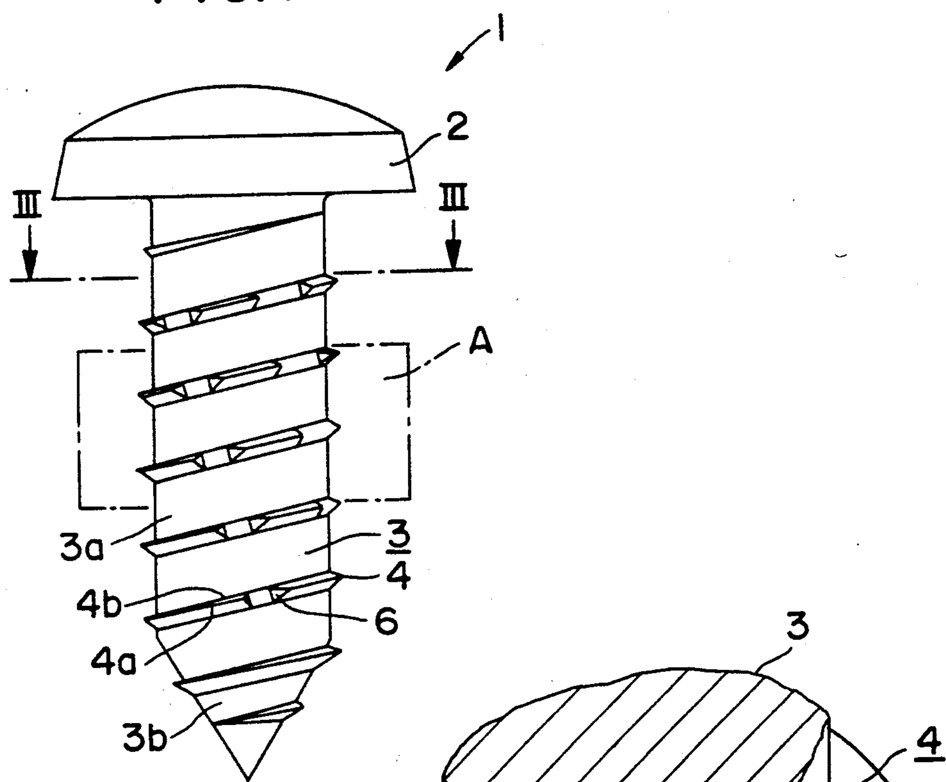
FIG. 1 is an elevational view of a thread forming fastener of the present invention.
Figure 2:
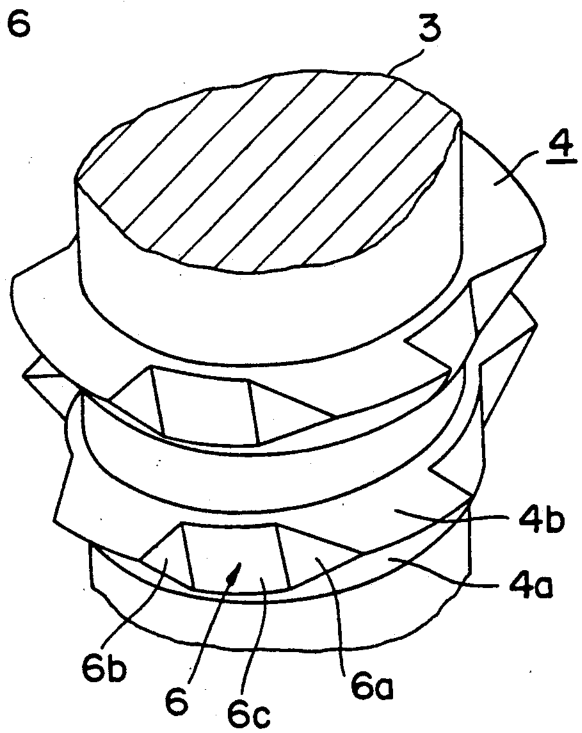
FIG. 2 is a partially enlarged perspective view of the fastener surrounded by lines and indicated as A in FIG. 1.
Figure 3:
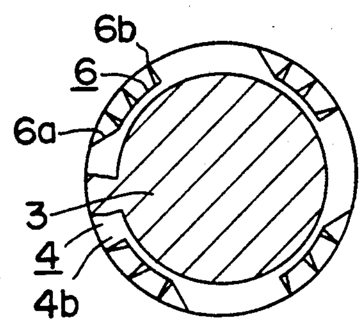
FIG. 3 is an enlarged cross-sectional view taken on line III—III in FIG. 1.
Figure 4:
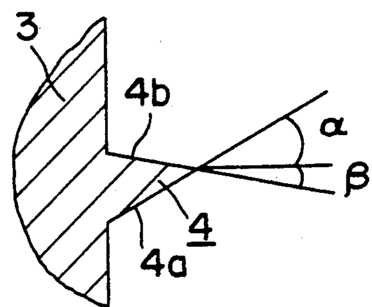
FIG. 4 is an enlarged longitudinal cross-sectional view of one of the screw threads of the present invention.

For a consideration of what I believe to be novel and inventive, attention is directed to the following disclosure. Referring to FIG. 1 through FIG. 4, the invention will first be described with reference to a thread forming fastener (thereinafter called as the fastener) indicated generally at 1 having a driven head 2 with a recess (not shown) as an instance for driving means (not shown), a shank portion 3 merged with the driven head 2. The shank portion 3 comprises a cylindrically straight portion 3*a* and a tapered end 3*b* which is merged with the straight portion 3*a* and has a conical angle of an approximately sixty (60) degrees. The fastener 1 provides with a single and rolled type continuous screw thread 4 of a certain pitch from the end of the tapered end 3*b* toward the straight portion 3*a*. One of the screw thread 4 is of a symmetric triangular shape in longitudinal cross section along its axis. That is, a progressive flank angle $\alpha$ of approximately thirty (30) degrees defined in a progressive flank 4*a* is not the same as a following flank angle $\beta$ of approximately ten (10) degrees defined in a following flank 4*b*. This configuration can help decreasing a reaction which is introduced in a female thread swaged in a workpiece 5 of plastic resin as an instance for the materials by a depression of the progressive flank 4*a* of the screw thread 4 while the fastener 1 is driven there and it can help decreasing a fatigue of the workpiece 5. It can also help increasing a deformation volume of the material depressed and deformed near the thread 4 in the workpiece 5 as much as possible by the following flanks 4*b* and increasing the parts of the material flown and dropped into slot recesses 6 hereinafter and decreasing a divided force of an axial tension in such directions that the fastener 1 can loosen during it creates the axial tension after the fastener 1 completes swaging a female thread and being fastened.

Further, the rolled type thread 4 over the straight portion 3*a* is interrupted by plural slot recesses 6 locating at an equal distance in one revolution of the thread 4 and being formed pretendedly as herical slot recesses with a lead angle inclined reverse to an inclination of the thread 4 and relative to an axis of the fastener 1 with a very small angle. The slot recesses 6 inclined to an axis of the fastener 1 causes the fastener 1 easily to be driven and to be prevented from rotating in such directions that it can loosen because all surfaces of the rearward edges 6*b* hereinafter of the interrupted threads 4 are mated with the drops 5*a* of the material 5 hereinafter so that the drops 5 can have a difficulty of being cut away and they can prevent the fastener 1 from rotating in such directions even if an unfastening torque is added. One of the slot recesses 6 is formed by a dully inclined leading edge 6*a* of the interrupted threads 4, a nearly perpendicular rearward edge 6*b* to a circular surface of the shank portion 3 and a flat-like bottom 6*c* located betweenthere. One of the slot recesses 6 is formed having a depth that is rather smaller than a height of the interrupted threads 4 and is approximately seventy (70) percentages of that of the threads 4. And it can be also selected depending on a percentage of the height of a screw thread to that of a female thread which is decided by both the height of the interrupted thread 4 and a diameter of a pilot hole 5*b* in the workpiece 5. Therefore, the recesses 6 are so formed that the greater the percentage of the height of the interrupted threads 4 to that of a female thread is, the deeper the depth of the recesses 6 is so that parts of the material swaged by the interrupted threads 4 can be moved and flown into recesses 6 nearby as much as possible.

Furthermore, a total amount of external lengths of the slot recesses 6 in one revolution of a rolled thread 4 is reached to be approximately half an external length of the screw thread 4 in the same revolution. The length of the recesses 6 is so formed longer in external direction that they can decrease a total engagement of the interrupted threads 4 with the workpiece 5 of plastic resin and concentrate a driving torque on the interrupted threads 4 so for the fastener 1 to be driven into even a harden plastic resin easily.

When a driver bit is engaged with a recess formed in a driven head 2 of the fastener described above and a driving torque is added to the fastener 1 so that it can be driven into a pilot hole 5*b* punched or pierced in a workpiece 5 of plastic resin, parts of a rolled type thread 4 over a tapered end 3*b* of a shank portion 3 can wedge a side wall of the hole 5*b* and begin swaging a female thread in it smoothly. During this operation, the fastener 1 can never nibble any material around the hole 5*b* in the workpiece 5 because the screw thread 4 over the tapered end 3*b* has a continuous crest without slot recess 6. At the next stage, a screw thread 4 over a straight portion 3*a* of the shank portion 3 can swage and enlarge the female thread to be a desirable shape during the fastener 1 keeps being driven there. During this operation, the driving torque given to it can be concentrated on the interrupted threads 4 and the fastener 1 can swage a female thread without fail even in a rather harden workpiece 5 because the screw thread 4 over the straight portion 3*a* is interrupted by plural slot recesses 6 at an equal distance.

Figure 5:
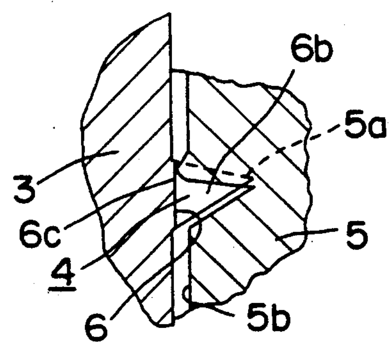
FIG. 5 is a partial longitudinal cross-sectional view illustrating such a condition that one of the screw threads of the present invention is mated with a workpiece of plastic resin.

And besides the following flanks 4*b* of the interrupted threads 4 depress the workpiece 5 of plastic resin while the fastener 1 has been driven there and then creates its axial tension. At the same time parts of the material 5 around each rearward edge 6*b* of the interrupted threads 4 are flown and dropped into recesses 6 nearby so as to be drops 5*a* of the material 5 there as shown in FIG. 5. During this operation, the volumes of the material 5 depressed and deformed by the following flanks 4*b* of the interrupted threads 4 are supposedly to be smaller than those by the progressive flanks 4*a* of the interrupted threads 4. However, the volumes of the material 5 flown and dropped into the recesses 6 are increased because of the smaller following flank angle $\beta$ of the interrupted threads 4 when the fastener 1 is in the axial tension and they can be moved to be the drops 5*a* of the material 5 enough strong to prevent the fastener 1 from rotating in such directions that it can loosen.

While the fastener 1 is repeatedly in thermo-cycles of an ambient temperature from high temperature to low one in such condition that it has been driven into the workpiece 5 of plastic resin, the material 5 can change its property in such ways that it is more fluidity at high temperature and the drops 5*a* of the material 5 can be sufficiently flown and dropped into the recesses nearby. Then the plastic resin can be shrunk and hardened by itself when the ambient temperature is lowered to be a room temperature. Therefore, the interrupted threads 4 mated with the drops 5*a* of the materials 5 are completely prevented from sliding back along the female thread in such directions that the fastener 1 can loosen. Further, the engagement of the progressive flanks 4*a* of the interrupted threads 4 with the female thread is decreased to decrease its axial tension because the plastic resin 5 is deformed by the thermo-cycle of the ambient temperature and an aging stress relaxation happens to the fastener 1. However, the fastener 1 can have a sufficient loosening torque and its holding strength with little loss because each corner of the rearward edges 6*b* at the following flank-side is so dully formed by means of the recesses 6 inclined relative to a screw axis on the rolled thread 4 that the drops 5*a* of the material 5 in the recesses 6 can be depressed by all the surfaces of the rearward edges 6*b* and cannot be wedged and destroyed by the corners of the rearward edges 6*b*.

EFFECT OF THE INVENTION

As described above, the fasteners of the present invention provide with shanks having straight portions with a screw thread of its longitudinally sectional symmetric shape having a rather greater progressive flank angle and a rather smaller following one, which is interrupted by plural slot recesses being pretendedly formed as herical ones with a lead angle inclined reverse to an inclination of the screw thread and relative to screw axis with a very small angle. Therefore, the fastener of the invention can have an advantage that it can concentrate a driving torque on the interrupted threads and can easily swage a female thread in a side wall of a pilot hole in a workpiece of plastic resin. And it can also have the an advantage that it can be prevented from rotating in such directions that it can loosen by the drops which are parts of the material around each corner of the rearward edges at the following flank-side and which are flown into recesses nearby while the following flanks of the interrupted threads of the fastener depress the plastic resin in an axial tension in it after it has been driven there. It, further can have an advantage that the fastener can avoid decreasing its loosening torque and its holding strength because the drops of the plastic resin can be hardened by the thermo-cycle of the ambient temperature and all surfaces of the rearward edges of the interrupted threads can depress the drops so that the drops cannot be wedged and destroyed by the rearward edges though the fastener decreases its axial tension because the engagement of the progressive flanks of the interrupted threads with a female thread is decreased in such conditions that the plastic resin is deformed by the thermo-cycle of the ambient temperature as well as in an aging stress relaxation.

I claim:

1. In a forming fastener comprising a driven head with a recess or a convex surface to be engaged with a driving tool and a shank portion with a rolled type thread having a first angle of a progressive flank and a second angle of a following flank, wherein the second angle is smaller than said first angle, the thread is interrupted by plural slot recesses being formed as helical slot recesses with a lead angle reverse to an inclination of the thread, the thread has parts of a continuous thread without any slot recess at its tapered end, each of the recesses is formed by a dully inclined leading edge of the interrupted thread, a nearly perpendicular rearward edge of its leading interrupted thread prevents said fastener from rotating in a direction that it can loosen, the thread is formed having a partially cut-away screw thread between two adjacent interrupted threads, and a depth of said slot recesses is selected as a percentage of a height of said screw to thread to that of a female thread formed thereby.

* * * * *

UNITED STATES PATENT AND TRADEMARK OFFICE

CERTIFICATE OF CORRECTION

PATENT NO. : 5,110,245

DATED : May 5, 1992

INVENTOR(S) : SAKAMOTO HIROYUKI

It is certified that error appears in the above-identified patent and that said Letters Patent is hereby corrected as shown below:

On the title page Insert:

Column [30] Foreign Application Priority Data:

Sept. 13, 1989 [JP] Japan ...... 1-238513

Signed and Sealed this

Twenty-second Day of September, 1992

*Attest:*

DOUGLAS B. COMER

*Attesting Officer* *Acting Commissioner of Patents and Trademarks*